United States Patent
Lee et al.

(10) Patent No.: US 8,952,641 B2
(45) Date of Patent: Feb. 10, 2015

(54) BIASING CIRCUIT FOR HALL SENSOR AND HALL AMPLIFIER IN MOTOR DRIVING CIRCUIT

(71) Applicant: Samsung Electro-Mechanics Co., Ltd., Gyeonggi-do (KR)

(72) Inventors: Soo Woong Lee, Gyeonggi-do (KR); Joo Yul Ko, Gyeonggi-do (KR)

(73) Assignee: Samsung Electro-Mechanics Co., Ltd., Gyeonggi-do (KR)

( * ) Notice: Subject to any disclaimer, the term of this patent is extended or adjusted under 35 U.S.C. 154(b) by 175 days.

(21) Appl. No.: 13/798,002

(22) Filed: Mar. 12, 2013

(65) Prior Publication Data

US 2013/0320899 A1    Dec. 5, 2013

(30) Foreign Application Priority Data

May 30, 2012    (KR) .................. 10-2012-0057543

(51) Int. Cl.
*H02K 29/08*    (2006.01)
*H02P 6/16*    (2006.01)

(52) U.S. Cl.
CPC ....................................... *H02P 6/16* (2013.01)
USPC ............. 318/400.38; 318/400.04; 318/400.26

(58) Field of Classification Search
USPC .......... 318/400.38, 400.04, 400.26, 569, 567, 318/635
See application file for complete search history.

(56) References Cited

U.S. PATENT DOCUMENTS 6,747,425 B2 *   6/2004   Marshall et al. ......... 318/400.26
2004/0227475 A1   11/2004  Yang et al.

FOREIGN PATENT DOCUMENTS

| JP | 2002-325479 A | 11/2002 |
| JP | 2009-177862 A | 8/2009 |
| KR | 10-0173940 B1 | 11/1998 |
| KR | 10-2012-0005216 A | 1/2012 |

* cited by examiner

*Primary Examiner* — Karen Masih
(74) *Attorney, Agent, or Firm* — Bracewell & Giuliani LLP; Brad Y. Chin

(57) ABSTRACT

Disclosed herein are a biasing circuit for a hall sensor and a hall amplifier in a motor driving circuit, the biasing circuit including: a regulator installed inside a singled packaged chip, supplied with external power, and regulating the external power in voltage appropriate for a circuit to supply the regulated voltage; the hall amplifier supplied with the voltage regulated from the regulator, receiving an output signal from the hall sensor outside the chip, and amplifying the output signal to output the amplified signal; first and second resistors supplied with the voltage from the regulator to generate an input voltage common mode (VCM) of the hall amplifier; and third and fourth resistors supplied with the voltage from the regulator to generate an input VCM of the hall sensor.

3 Claims, 2 Drawing Sheets

- PRIOR ART -

US 8,952,641 B2

BIASING CIRCUIT FOR HALL SENSOR AND HALL AMPLIFIER IN MOTOR DRIVING CIRCUIT

CROSS REFERENCE(S) TO RELATED APPLICATIONS

This application claims the benefit under 35 U.S.C. Section 119 of Korean Patent Application Serial No. 10-2012-0057543, entitled "Biasing Circuit for Hall Sensor and Hall Amplifier in Motor Driving Circuit" filed on May 30, 2012, which is hereby incorporated by reference in its entirety into this application.

BACKGROUND OF THE INVENTION

1. Technical Field

The present invention relates to a biasing circuit for a hall sensor and a hall amplifier in a motor driving circuit, and more particularly, to a biasing circuit for a hall sensor and a hall amplifier in a motor driving circuit capable of preventing deterioration of characteristics (performance) between the hall sensor and the hall amplifier in spite of a change in a process voltage temperature (PVT).

2. Description of the Related Art

A typical example of an image forming device which is a device performing generation, printing, reception, transmission, or the like, of image data may include a printer, a scanner, a copy machine, a facsimile, a multi-function device in which functions of the printer, the scanner, the copy machine, the facsimile are integrated, and the like.

The image forming device as described above uses motors in order to perform various functions such as movement of a printing paper, supply of the printing paper, and the like. Recently, as optional units performing various functions, such as an auto document feeder (ADF) unit, a finisher unit, a high capacity feeder (HCF) unit, and a double capacity feeder (DCF) unit may be attached to the image forming device, the number of motors that may be used in the image forming device has gradually increased.

Recently, a brushless DC (BLDC) motor has been mainly used in order to prevent noise generated at the time of driving the image forming device. In the BLDC motor, which is a motor that does not include a brush structure in a DC motor and electronically performs rectification, a mechanical friction part between a brush and a commutator is removed, such that a speed may increase and a small amount of noise is generated.

Since the BLDC motor does not the brush structure as described above, it requires a driving circuit in that position information of a rotor should be sensed using a hall sensor, or the like, and power should be sequentially applied to each phase of the BLDC motor to perform a control.

That is, in order to drive the motor, an additional motor driving circuit as well as a main controlling unit is required. In addition, the motor driving circuit should detect position information of an electromagnet used in the motor. To this end, a hall sensor capable of detecting magnetic field information of the electromagnet is used. The hall sensor is a component generating an output that is in proportion to a predetermined level or more of magnetic field intensity applied from the outside. In addition, since the hall sensor itself has a small output of several μV to several tens mV, a hall amplifier should be additionally used in an integrated circuit (IC). In this case, appropriate biasing should be applied to the hall sensor outside a chip and the hall amplifier inside of the chip to allow the motor driving circuit to maintain optimal performance in spite of a change in a process voltage temperature (PVT).

RELATED ART DOCUMENT

Patent Document (Patent Document 1) Korean Patent Laid-Open Publication No.10-2012-0005216
(Patent Document 2) Japanese Patent Laid-Open Publication No.2009-177862
(Patent Document 3) Japanese Patent Laid-Open Publication No.2002-325479.

SUMMARY OF THE INVENTION

An object of the present invention is to provide a biasing circuit for a hall sensor and a hall amplifier in a motor driving circuit capable of preventing deterioration of characteristics (performance) between the hall sensor and the hall amplifier in spite of a change in a process voltage temperature (PVT) by applying appropriate biasing to the hall sensor outside a chip and the hall amplifier inside the chip.

According to an exemplary embodiment of the present invention, there is provided a biasing circuit for a hall sensor and a hall amplifier in a motor driving circuit, the biasing circuit including: a regulator installed inside a singled packaged chip, supplied with external power, and regulating the external power in voltage appropriate for a circuit to supply the regulated voltage; the hall amplifier supplied with the voltage regulated from the regulator, receiving an output signal from the hall sensor outside the chip, and amplifying the output signal to output the amplified signal; first and second resistors supplied with the voltage from the regulator to generate an input voltage common mode (VCM) of the hall amplifier; and third and fourth resistors supplied with the voltage from the regulator to generate an input VCM of the hall sensor.

The first resistor may have one end connected to the regulator and the other end connected to one side input terminal of the hall amplifier, and the second resistor may have one end connected to the other side input terminal of the hall amplifier and the other end connected to a ground.

The third resistor may have one end connected to the regulator and the other end connected to the hall sensor, and the fourth resistor may have one end connected to the hall sensor and the other end connected to a ground.

DESCRIPTION OF THE PREFERRED EMBODIMENTS

Terms and words used in the present specification and claims are not to be construed as a general or dictionary meaning, but are to be construed to meaning and concepts meeting the technical ideas of the present invention based on a principle that the inventors can appropriately define the concepts of terms in order to describe their own inventions in the best mode.

Throughout the present specification, unless explicitly described to the contrary, "comprising" any components will be understood to imply the inclusion of other elements rather than the exclusion of any other elements. A term "part", "module", "device", or the like, described in the specification means a unit of processing at least one function or operation and may be implemented by hardware or software or a combination of hardware and software.

Hereinafter, exemplary embodiments of the present invention will be described in detail with reference to the accompanying drawings.

Here, prior to describing the exemplary embodiment of the present invention in detail, an example of a biasing circuit for a hall sensor and a hall amplifier in a motor driving circuit according to the related art will be first described in order to assist in the understanding of the present invention.

Figure 1:
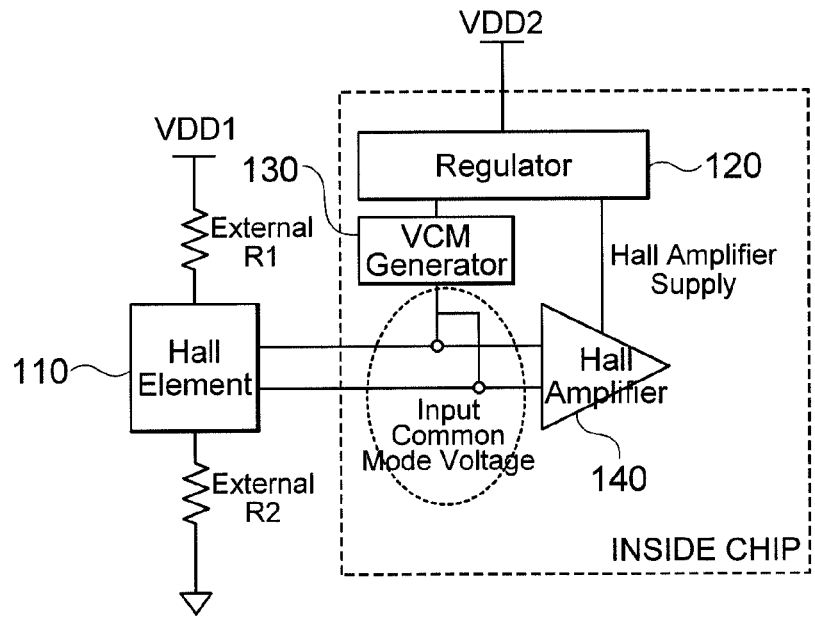
FIG. 1 is a view schematically showing a configuration of a biasing circuit for a hall sensor and a hall amplifier in a motor driving circuit according to the related art.

FIG. 1 is a view schematically showing a configuration of a biasing circuit for a hall sensor and a hall amplifier in a motor driving circuit according to the related art.

As shown in FIG. 1, the biasing circuit for a hall sensor and a hall amplifier in a motor driving circuit according to the related art has a structure in which the hall sensor (a hall element) 110 positioned outside a chip is supplied with first power VDD1 and components inside the chip are supplied with second power VDD2. That is, a regulator 120 inside the chip receives voltage applied from the second power VDD2 and regulates the voltage into voltage appropriate for a circuit to supply the regulated voltage, and each of a VCM generator 130 and a hall amplifier 140 is supplied with the voltage regulated from the regulator 120 to thereby be driven.

In the biasing circuit for the hall sensor and the hall amplifier in the motor driving circuit according to the related art having the above-mentioned structure, since the hall sensor 110 may not be implemented inside the chip, it is important to allow biasing conditions of the hall sensor 110 and the hall amplifier 140 to be as equal as possible to each other. In FIG. 1, when it is assumed that VDD1=VDD2=5V, a voltage common mode (VCM) of the hall sensor 110 is determined by EXT_R1 and EXT_R2, and a VCM of the hall amplifier 140 is generally generated by the VCM generator 130 to become an input VCM of the hall amplifier 140. That is, the VCM of the hall amplifier 140 may be changed by characteristics of the regulator 120 as well as the VCM generator 130. In other words, it is not easy to bias the input VCM of the hall sensor 110 and the output voltage of the hall amplifier 140 to the same value with respect to a change in a PVT. In the case in which accurate biasing voltage, that is, the VCM in a circuit desired by a designer may not be indicated, a kind of mismatching phenomenon is caused to deteriorate performance of the circuit. That is, noise increases and sensitivity decreases, thereby making it possible to decrease a gain. First of all, an output duty ratio which is the most important characteristic of the hall amplifier 140 decreases. The reason is that kinds of resistors used inside and outside the chip are different, such that the resistors inside and outside of the chip differently react to the change in the PVT and the regulator inside the chip also indicates different characteristics according to the change in the PVT.

According to the present invention which is suggested in order to solve the problems as described above in the biasing circuit for a hall sensor and a hall amplifier in a motor driving circuit according to the related art, a biasing circuit for a hall sensor and a hall amplifier in a motor driving circuit capable of preventing deterioration of characteristics (performance) between the hall sensor and the hall amplifier in spite of a change in a PVT by applying appropriate biasing to the hall sensor outside a chip and the hall amplifier inside the chip is provided.

Figure 2:
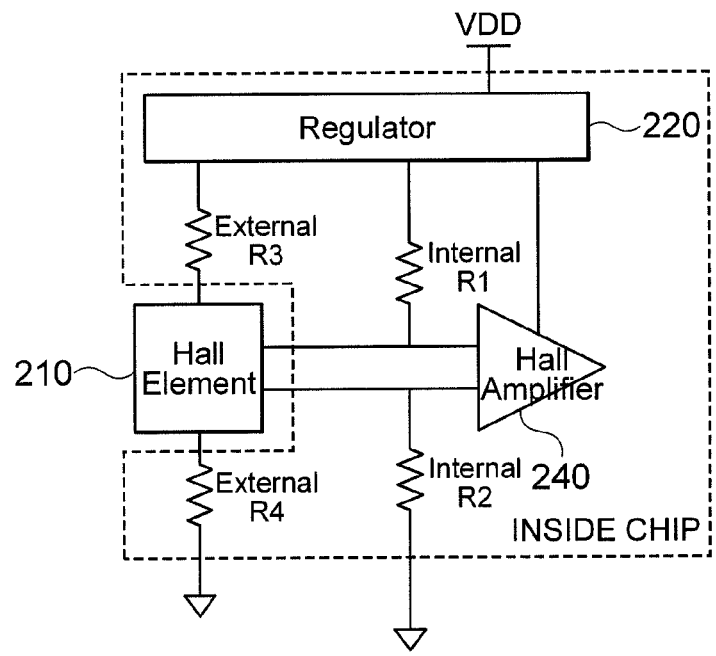
FIG. 2 is a view schematically showing a configuration of a biasing circuit for a hall sensor and a hall amplifier in a motor driving circuit according to an exemplary embodiment of the present invention.

FIG. 2 is a view schematically showing a configuration of a biasing circuit for a hall sensor and a hall amplifier in a motor driving circuit according to an exemplary embodiment of the present invention.

Referring to FIG. 2, the biasing circuit for a hall sensor and a hall amplifier in a motor driving circuit according to the exemplary embodiment of the present invention is configured to include a regulator 220, a hall amplifier 240, first and second resistors R1 and R2, and third and fourth resistors R3 and R4.

The regulator 220 is installed inside a single packaged chip, is supplied with external power VDD, and regulates the external power VDD into voltage appropriate for a circuit to supply the regulated voltage.

The hall amplifier 240 is supplied with the voltage regulated from the regulator 220, receives an output signal from a hall sensor (hall element) 210 outside the chip, and amplifies the output signal to output the amplified signal.

The first and second resistors R1 and R2 are supplied with the voltage from the regulator 220 to generate an input voltage common mode (VCM) of the hall amplifier 240.

The third and fourth resistors R3 and R4 are supplied with the voltage from the regulator 220 to generate an input VCM of the hall sensor 210.

Here, as shown in FIG. 2, the first resistor R1 has one end connected to the regulator 220 and the other end connected to one side input terminal of the hall amplifier 240, and the second resistor R2 has one end connected to the other side input terminal of the hall amplifier 240 and the other end connected to a ground.

In addition, the third resistor R3 has one end connected to the regulator 220 and the other end connected to the hall sensor 210, and the fourth resistor R4 has one end connected to the hall sensor 210 and the other end connected to the ground.

Next, an operation of the biasing circuit for a hall sensor and a hall amplifier in a motor driving circuit according to the exemplary embodiment of the present invention having the above-mentioned configuration will be schematically described.

The regulator 220 is supplied with the external power VDD and regulates the external power VDD into the voltage appropriate for the circuit to supply the regulated voltage. Therefore, the third and fourth resistors R3 and R4 are supplied with the voltage from the regulator 220 to generate the input VCM of the hall sensor 210. In this case, the hall sensor 210 is driven to output a sensing signal.

In addition, the first and second resistors R1 and R2 are supplied with the voltage from the regulator 220 to generate the input VCM of the hall amplifier 240. Therefore, the hall amplifier 240 is supplied with the voltage regulated from the regulator 220, receives the output signal from the hall sensor 210 outside the chip, and amplifies the output signal to output the amplified signal.

Figure 3A:
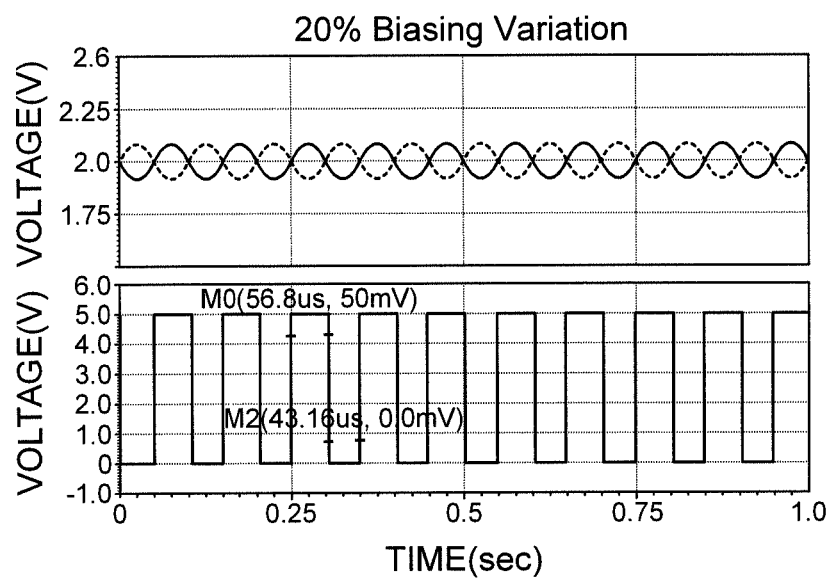
FIGS. 3A and 3B are views showing a simulation result of a biasing scheme by the biasing circuit for a hall sensor and a hall amplifier in a motor driving circuit according to the exemplary embodiment of the present invention.
Figure 3B:
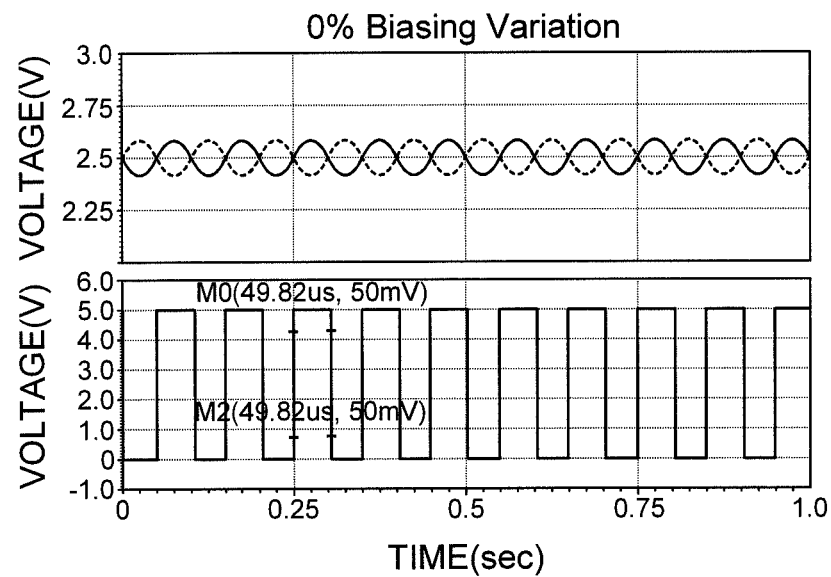

FIGS. 3A and 3B are views showing a simulation result of a biasing scheme by the biasing circuit for a hall sensor and a hall amplifier in a motor driving circuit according to the exemplary embodiment of the present invention.

Referring to FIGS. 3A and 3B, FIG. 3A shows a simulation result of a biasing scheme by the biasing circuit for a hall sensor and a hall amplifier in a motor driving circuit according to the related art in the case in which it is assumed that there is a biasing error of 20%, and FIG. 3B shows a simulation result of a biasing scheme by the biasing circuit for a hall sensor and a hall amplifier in a motor driving circuit according to the exemplary embodiment of the present invention in the case in which it is assumed that there is no biasing error. As seen from the simulation results, in FIG. 3A corresponding to the case in which there is a biasing error of 20%, a duty ratio is 57:43; however, in FIG. 3B corresponding the case in which there is no biasing error, a duty ratio is approximately 50:50. When it is assumed that a resistance change rate by the PVT is +/−20%, a duty ratio error of about 15% is generated. However, according to the exemplary embodiment of the present invention, the biasing error becomes 0%, thereby making it possible to minimize the duty ratio error.

As set forth above, with the biasing circuit for a hall sensor and a hall amplifier in a motor driving circuit according to the exemplary embodiment of the present invention, all of the resistors outside of the chip determining the input VCM of the hall sensor are integrated inside the chip and both of the hall sensor and the hall amplifier use the output voltage of the regulator by a single VDD as power, such that the same characteristics for the same change in the PVT may be obtained. As a result, the duty ratio error may be minimized.

Although the exemplary embodiments of the present invention have been disclosed for illustrative purposes, the present invention is not limited thereto, but those skilled in the art will appreciate that various modifications, additions and substitutions are possible, without departing from the scope and spirit of the invention as disclosed in the accompanying claims. Therefore, the protection scope of the present invention must be analyzed by the appended claims and it should be analyzed that all spirits within a scope equivalent thereto are included in the appended claims of the present invention.

What is claimed is:

1. A biasing circuit for a hall sensor and a hall amplifier in a motor driving circuit, the biasing circuit comprising:
    a regulator installed inside a singled packaged chip, supplied with external power, and regulating the external power in voltage appropriate for a circuit to supply the regulated voltage;
    the hall amplifier supplied with the voltage regulated from the regulator, receiving an output signal from the hall sensor outside the chip, and amplifying the output signal to output the amplified signal;
    first and second resistors supplied with the voltage from the regulator to generate an input voltage common mode (VCM) of the hall amplifier; and
    third and fourth resistors supplied with the voltage from the regulator to generate an input VCM of the hall sensor.

2. The biasing circuit according to claim 1, wherein the first resistor has one end connected to the regulator and the other end connected to one side input terminal of the hall amplifier, and the second resistor has one end connected to the other side input terminal of the hall amplifier and the other end connected to a ground.

3. The biasing circuit according to claim 1, wherein the third resistor has one end connected to the regulator and the other end connected to the hall sensor, and the fourth resistor has one end connected to the hall sensor and the other end connected to a ground.

\* \* \* \* \*